Feb. 10, 1970   H. R. COPELAND ET AL   3,494,189
SAMPLE HOLDER FOR WRINKLE RECOVERY TEST APPARATUS
Filed Oct. 16, 1968                                       2 Sheets-Sheet 2

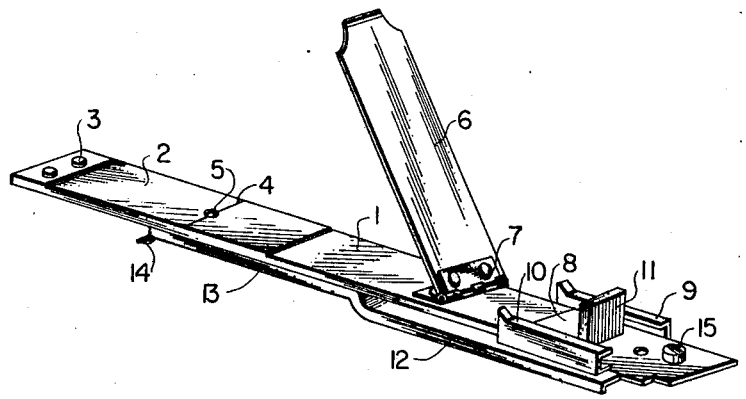
FIG.1
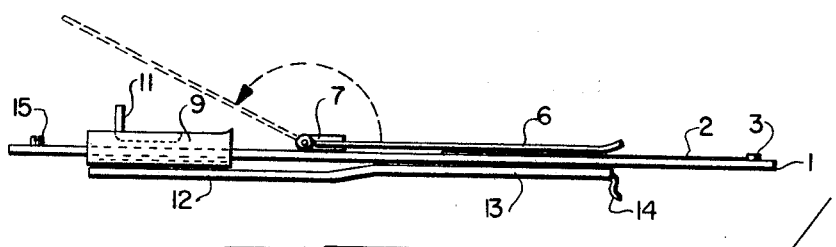
FIG.2
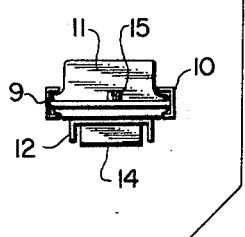

INVENTORS
HERBERT R. COPELAND
McLEAN GEORGE
ANTHONY R. MARKEZICH

BY R. Hoffman
ATTORNEY

United States Patent Office 3,494,189
Patented Feb. 10, 1970

3,494,189
SAMPLE HOLDER FOR WRINKLE RECOVERY TEST APPARATUS
Herbert R. Copeland, McLean George, and Anthony R. Markezich, New Orleans, La., assignors to the United States of America as represented by the Secretary of Agriculture
Filed Oct. 16, 1968, Ser. No. 768,148
Int. Cl. G01n 33/36
U.S. Cl. 73—159                                    1 Claim

ABSTRACT OF THE DISCLOSURE

A holder which holds a fabric sample in a wrinkle recovery tester. The holder has a spring leaf coextensive with a base plate over a distance sufficient to secure part of a fabric sample under the spring while another part of the sample is folded on top of the spring leaf. The spring leaf also has an index wark and an index hole to accurately position the fabric. A hinge locates the releaseable flap on the base plate with the free end of the flap overlapping about one half of the spring leaf. A sliding lock is moveable along the base plate to secure the release flap in position against the spring leaf. An extended member integral with the sliding lock and located on an opposing face of the base plate carries a contact member at its free end which engages a corresponding contact member on an external wrinkle recovery gauging device. Release of the sliding lock allows the release flap to assume an open position and thereby permits the creased fabric to be free to regain its uncreased condition.

---

Figure 3:
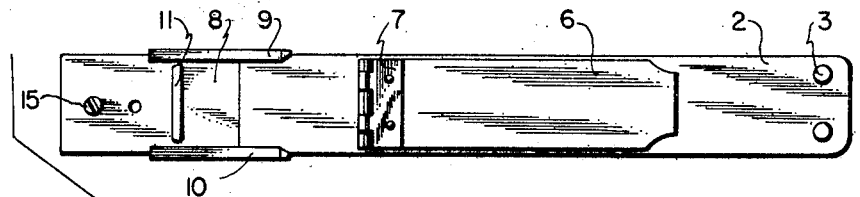
Figure 3:
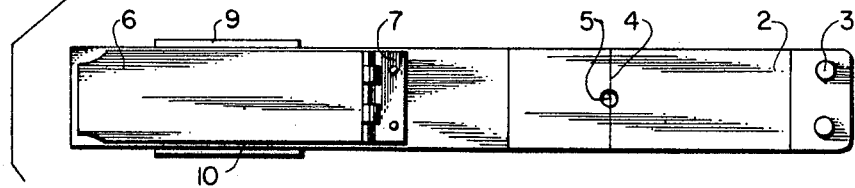

A non-exclusive, irrevocable, royalty-free license in the invention herein described, throughout the world for all purposes of the United States Government, with the power to grant sublicenses for such purposes, is hereby granted to the Government of the United States of America.

The wrinkle recovery test for which test the improved sample holder of this invention was developed involves, in essence, a fabric test sample, creased and compressed under controlled conditions of time and load. The sample after creasing, is suspended in a testing device for a controlled recovery period, following which the crease recovery angle is measured with a protractor. The testing device, which device as such is not a part of this invention, comprises a protractor and transparent disc facing therefore, both protractor and facing mounted coaxially on a vertical support so that they are free to rotate about a horizontal axis. The center of the disc-protractor assembly is marked and a vertical guide line is drawn on the support from center to base. The transparent disc is provided with a vernier having a central zero point which point indicates on the protractor the angle formed by the creased fabric sample when the latter is mounted in the test device. The fabric sample itself, while in the device, is held by the holder which is the subject of this invention.

A clamp, which clamp is integral the test device, supports the holder and the sample. The integral clamp is provided with a contact means which contact means is adapted to coact with a counterpart contact means carried by the sample holder of the invention. Coaction of the two above-named contact means concomitant with insertion of the sample holder and fabric sample into the test device accomplishes opening of the sliding lock on the sample holder, freeing of the release flap on the holder with simultaneous release of one end of the experimentally creased fabric sample for the ultimate measurement of crease angle recovery.

The prior art sample holder consists of two superimposed metal leaves 1.6 cm. wide but of different lengths, the two leaves being fastened together at one end. The linear distance between the free ends of the two leaves is 2.3 cm. The top and shorter leaf is 0.16 mm. thick ($\pm 0.01$ mm.) and carries an index line across its top surface 1.8 cm. from and parallel to its free end. A transparent plastic press clip is used in conjunction with the above-described prior art sample holder. The press clip consists of two superimposed leaves of equal length (9.5 cm.) and  cm. wide fastened together at one end. A platform made of the same plastic material 2.3 cm. in length and of the same width as the leaves of the press clip is permanently attached to the outer surface of the free end of one leaf (the outer edges of the leaf and platform being flush).

Test samples of fabric are cut 1.5 × 4 cm. in both the warp and filling direction.

The wrinkle or crease recovery test (ASTM designation: D1295–60T) is carried out as follows. A fabric test sample is placed between the leaves of the sample holder with one end inserted to a point directly under the 1.8 cm. index mark on the upper shorter leaf. The free end of the fabric sample is then carried back up and over the shorter leaf end to form a loop that will subsequently be the location of the experimental crease. The fabric sample is then secured within the holder with the plastic press clip which is placed over the holder so that the jaw of te clip carrying the platform is outside and parallel to the longer leaf of the metal holder. The flat thick jaw of the press clip is then adjacent the looped over end of the fabric sample. The open end of the clip jaw is then brought into firm contact with the fabric so that the guide line on the short metal leaf, the exposed portion of the fabric sample and the open end of the press clip are aligned. This operation will form a crease in the fabric sample about $\frac{1}{16}$ inch from the end of the short metal leaf of the holder about which the fabric sample is looped.

The press clip-sample holder assembly is now inverted on a flat surface and a 500 gram load is applied to the sample via the platform on the press clip.

After a creasing interval of five minutes, the 500 gram load is removed from the clip platform and the press-holder combination is picked up and inserted into the testing device. The press component of the press-holder is now removed and the experimentally installed crease is lined up with a spot at the center of the testing device disc. The free end of fabric sample (released when the press component is removed as above) is lined up immediately with the vertical guide line on the tester.

The free end of the fabric sample is kept aligned with the vertical guide line of the testing device by manual adjustment every 15 seconds for the first minute and once every minute thereafter. The recovery angle is measured by means of the protractor on the test device after a five minute recovery time. It is plain from the above description that considerable handling of the sample must take place prior to actual measurement of the recovery. It is also plain that use of the prior art press and holder assembly allows for a sizable amount of test operator bias to enter into the overall measuring operation. It is the object of this invention to provide an improved fabric sample holder that incorporates all the functions of the press-holder assembly into a single unit, reduces handling of the fabric sample to a minimum, and virtually excludes the possibilities of test operator bias.

A more comprehensive understanding of both the construction and the operation of the improved sample holder can be obtained by recourse to the accompanying drawings.

Referring to FIGURE 1, the base plate 1 is a rigid rectilinear piece that supports the remaining components; the spring leaf 2 is located on one face of the base plate, is coextensive therewith over a portion of base plate face and is securely attached thereto at one end with fastening means 3; the unattached end of the spring leaf can be raised away from contact with the base plate for the purpose of inserting a fabric sample swatch between the face of the base plate and the adjacent face of the spring leaf; index line 4 on the exposed face of the spring leaf and index hole 5 which passes through the spring leaf insure the correct positioning of the fabric sample between the components. The release flap 6 is rectilinear in shape longitudinally resilient in width dimension and attached to a face of the base plate with hinge means 7, the hinge means is so designed that the release flap can swing freely from a position lying atop the base plate and a portion of the spring leaf and coextensive therewith to a position at least 160° open and away from the base plate and spring leaf, the sliding lock means 8 is a subassembly supported by the base plate, portions 9 and 10 of the lock means embrace the edges of the base plate and form a sliding contact therewith. Portion 11 constitutes a handle for the manual movement of the locking means along the base plate during the fabric sample loading operation. The leading edges of portions 9 and 10 are flared outward away from contact with the base plate an amount and a distance just sufficient to embrace and cover the hinge secured end of release flap when the locking means is moved along the base plate toward the release flap. The base plate embracing portions of items 9 and 10 of the sliding lock means continues on around to the opposite face of the base plate where they converge and become an integral part of an extended member 12 which member extends lengthwise along the face of the base plate making sliding contact therewith at portion 13 and finally terminates in contact portion 14. Item 15 is a stop that prevents the lock from sliding off the end of the base plate.

FIGURE 2 shows a side view and an end view of the sample holder.

FIGURE 3 shows two views of the top face of the sample holder. View A shows the release flap in closed position laying atop the spring leaf. In this view the sliding lock means has not been moved to the right to lock the release flap in closed position. View B shows the release flap in open position away from the spring leaf.

Figure 4:
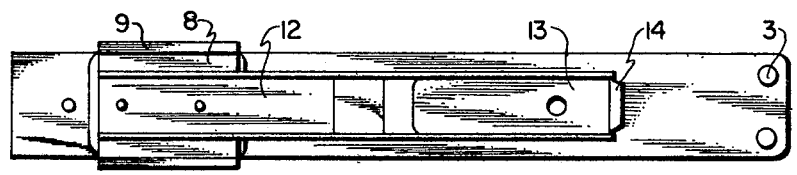

FIGURE 4 shows the bottom face of the sample holder and particularly the sliding lock means together with the integral extended arm and terminal contact means.

It should be understood that thus far in its description of the sample holder the face of the base plate designated the top face is in fact the top face only during the loading of the fabric sample swatch into the holder with one end of the swatch placed beneath the spring leaf and the other end folded over the free end of the spring leaf and held down by the release flap, the release flap being in closed and locked position. At each time subsequent to the formation of the experimental crease as the sample holder is inserted into the wrinkle recovery device, the sample holder is turned over with the face of the base plate carrying the spring leaf and the release flap directed downward. Coaction of the contact means on the end of the extended member with its counterpart on the gauging device concomitant with insertion of the sample holder into the gauging device causes the sliding lock means to be displaced along the base plate from lock position to unlock position thereby to permit the release flap to swing downward and away from closed position under the influence of gravity. The unsecured end of the fabric swatch distal the experimental crease is then free. The crease can now recover. Recovery is measured over a specified time interval.

The improved sample holder which is the subject of this invention can be constructed of any of a variety of materials that exhibit the particular physical properties requisite to the individual components.

The base plate, the sliding lock means, the extended member, and the contact means, for example, must be rigid and dimensionally stable since these portions of the holder provide support for other components of the holder and provide correct positional fit of the holder within the wrinkle recovery gauging device.

The spring leaf and the release flap must be resilient in the longitudinal dimension since a certain amount of inherent resilient spring tension in these components will provide for the retention of the fabric sample in proper position and additionally allow the imposed weight to bear against the fabric through these members for installation of the test crease.

We claim:

1. A sample holder dimensionally adapted for operable insertion into separate, external, crease-recovery gauging device, said holder comprising in combination, the following integrally assembled constituent parts:
  (a) rigid rectilinear base plate,
  (b) rectilinear spring leaf, longitudinally resilient in width dimension, and with one end attached coincident an end of the base plate, said spring leaf located on a first width dimension face of the base plate, coextensive with the base plate over a distance at least sufficient to accept and to secure between the adjacent faces of the base plate and the spring leaf by reason of resilient spring tension of the spring leaf a portion of a fabric sample,
    (1) index mark across the exposed face of the spring leaf parallel to the unattached end,
    (2) index hole passing through the spring leaf at the midpoint of the index mark, said mark and said hole adapted jointly to insure accurate positioning of a portion of a fabric sample placed between the spring leaf and the base plate,
  (c) release flap longitudinally resilient in width dimension, secured at one end to said first width dimension face of the base plate with a rectangularly transverse hinge means said hinge means located intermediate the free end of the spring leaf and the unencumbered end of the base plate, said release flap coextensive with said base plate for a sufficient distance so that the free end will overlap approximately one half of the spring leaf distal the leaf attachment to the base plate, said hinge means adapted to allow the release flap, in closed position, to lie flat and coincident the base plate and the spring leaf, atop and contacting the latter and in open position to swing freely in an arc of at least 160° outward and away from the base plate and spring leaf,
  (d) sliding lock means embracing a portion of the base plate, supported by the base plate and movable along the base plate, from a lock position and to an unlock position, said lock means adapted, in lock position, to engage and embrace edge portions of the release flap and secure same in closed position against the spring leaf, said lock means further adapted, in unlock position to disengage and release the edge portions of the flap from embrace and allow the release flap to swing in open position outward and away from the base plate and spring leaf,
    (1) extended member with one end integral the sliding lock means and with the free end disposed lengthwise along the second width dimension face of the base plate, parallel thereto and in sliding contact therewith,
    (2) contact means located on the free end of said extended member, said contact means adapted to engage and to coact with fixed counterpart contact means located on an external wrinkle recovery gauging device, whereby lengthwise ment of the entire sampler holder concomitant insertion of the sample holder, with the first width dimension face downward and with release flap in lock position, into said external wrinkle recovery gauging device will effect contact and resultant coaction of the two above-recited contact means, impart lengthwise sliding motion relative the base plate to the extended member and integral sliding lock means, move the sliding lock means to unlock position, free the release flap and allow same to swing outward away from closed position to open position.

References Cited

UNITED STATES PATENTS

| | | | |
|---|---|---|---|
| 2,268,677 | 1/1942 | Shearer et al. | 73—159 |
| 2,712,755 | 7/1955 | Meytre | 73—159 XR |
| 2,860,510 | 11/1958 | Press | 73—159 |

OTHER REFERENCES

Further Automation of The SRRL Wrinkle Recovery Tester, American Dyestuff Reporter, Vol. 51, No. 6, pp. 31–32.

An Approach to Automation of A Wrinkle Recovery Tester, American Dyestuff Reporter, Vol. 49, No. 9, pp. 25–27.

LOUIS R. PRINCE, Primary Examiner

W. A. HENRY II, Assistant Examiner